United States Patent [19]
Hartz

[11] 3,791,308
[45] Feb. 12, 1974

[54] MASS TRANSIT SYSTEM

[76] Inventor: Billy J. Hartz, 4016 N. E. 110th, Seattle, Wash. 98125

[22] Filed: Mar. 23, 1973

[21] Appl. No.: 344,092

Related U.S. Application Data

[63] Continuation of Ser. No. 77,060, Oct. 1, 1970, abandoned.

[52] U.S. Cl. ........ 104/139, 104/23 FS, 104/148 LM
[51] Int. Cl. ............................. B61d 5/00, B60v 1/00
[58] Field of Search ...................... 104/88, 138–144, 104/134, 148 LM; 105/141, 144

[56] References Cited
UNITED STATES PATENTS

| | | | |
|---|---|---|---|
| 402,839 | 5/1889 | Judson | 104/144 |
| 500,943 | 7/1893 | Perpin | 104/139 |
| 558,807 | 4/1896 | Heinle | 104/139 |
| 717,798 | 1/1903 | Beerwald | 104/139 |
| 965,768 | 7/1910 | Van Sant | 104/139 |
| 2,980,034 | 4/1961 | Harty | 238/8 |
| 3,006,288 | 10/1961 | Brown | 104/138 R |
| 3,368,496 | 2/1968 | Falk et al. | 104/138 R |
| 3,373,697 | 3/1968 | Hartje | 104/23 FS |
| 3,381,627 | 5/1968 | Hart et al. | 104/23 FS |
| 3,483,829 | 12/1969 | Baary | 104/88 |
| 3,526,193 | 9/1970 | Parshall | 104/88 |
| 3,556,012 | 1/1971 | Parshall | 104/88 |

Primary Examiner—Robert G. Sheridan
Assistant Examiner—Richard A. Bertsch
Attorney, Agent, or Firm—Orland M. Christensen

[57] ABSTRACT

A mass transit system compatible with existing right-of-way usages is described. A self-propelled carriage mechanism supports the passenger compartment in both the vertical and horizontal planes by means of a vertical strut, with the passenger compartment positioned substantially above the running gear. The running gear travels within an entrenched passageway having a narrow slit at the top for passage of the strut connecting the passenger compartment and the running gear. The top surface of this passageway is suitable for use by surface traffic and a flexible closure member may be utilized to close the slit prior to and subsequent to passage of the mass transit vehicle. The passenger compartment is positioned far enough above the running gear so as to clear surface traffic and to avoid collision of the passenger compartment with other vehicles occupying the right-of-way. The entrenched passageway in which the running gear operates may be positioned in the center of a roadway between the lanes of traffic, at the edge thereof or in other right-of-way locations, as desired. Switching mechanisms are provided so that the invention may be used in feeder and trunk line-type applications as well as loop-type and car reversal methods of use.

17 Claims, 10 Drawing Figures

PATENTED FEB 12 1974
3,791,308
SHEET 1 OF 3
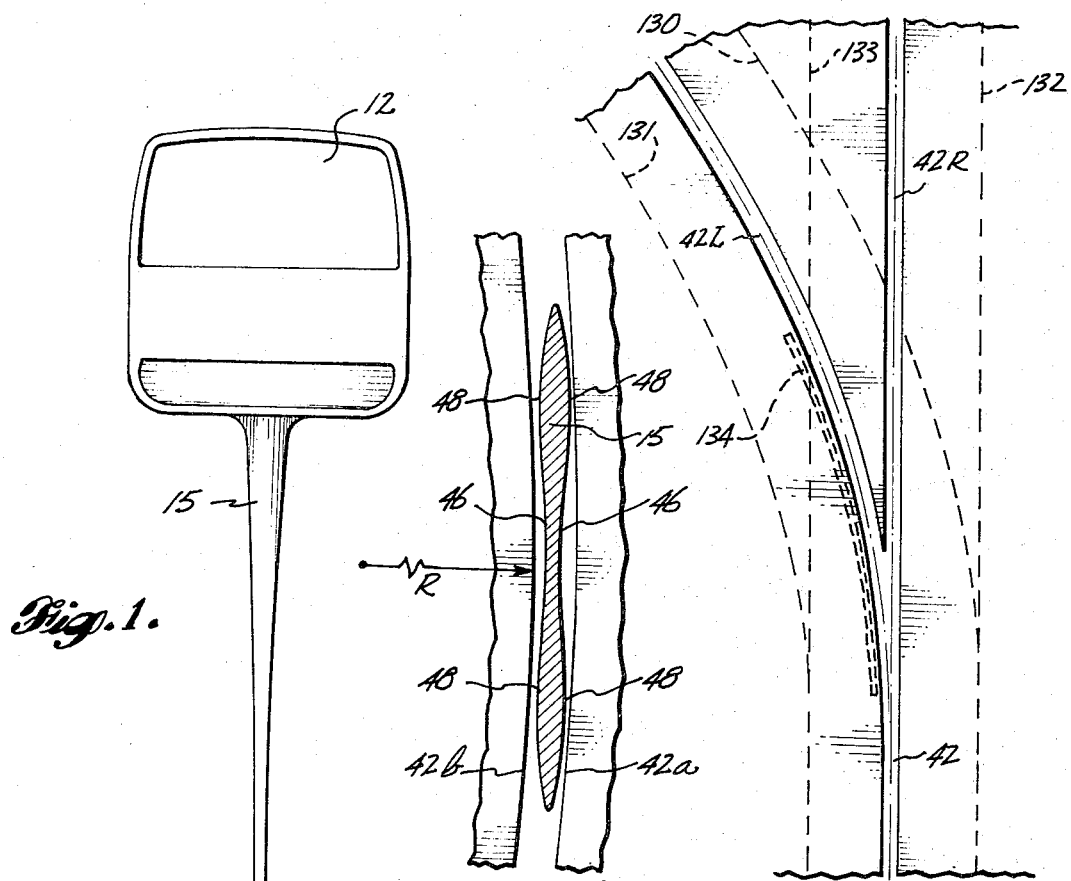
Fig. 1.
Fig. 2.
Fig. 4.
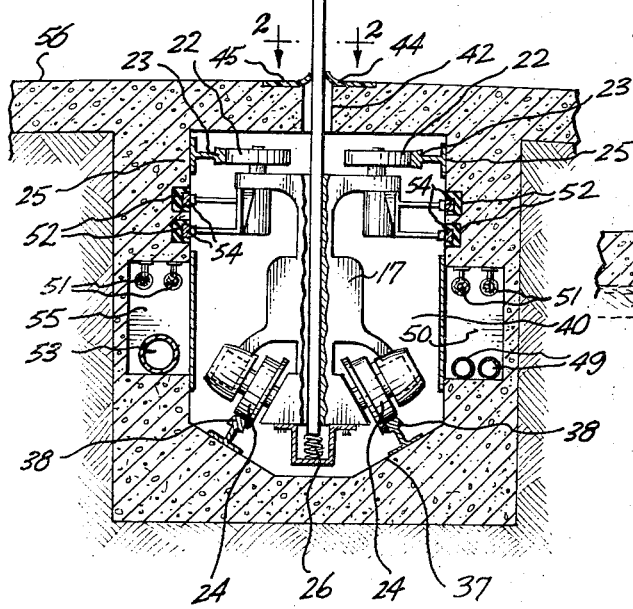
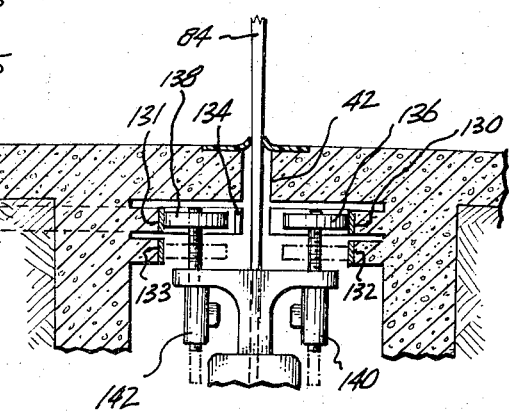
Fig. 3.
INVENTOR.
BILLY J. HARTZ
BY Christensen, Sanborn
& Matthews
ATTORNEYS

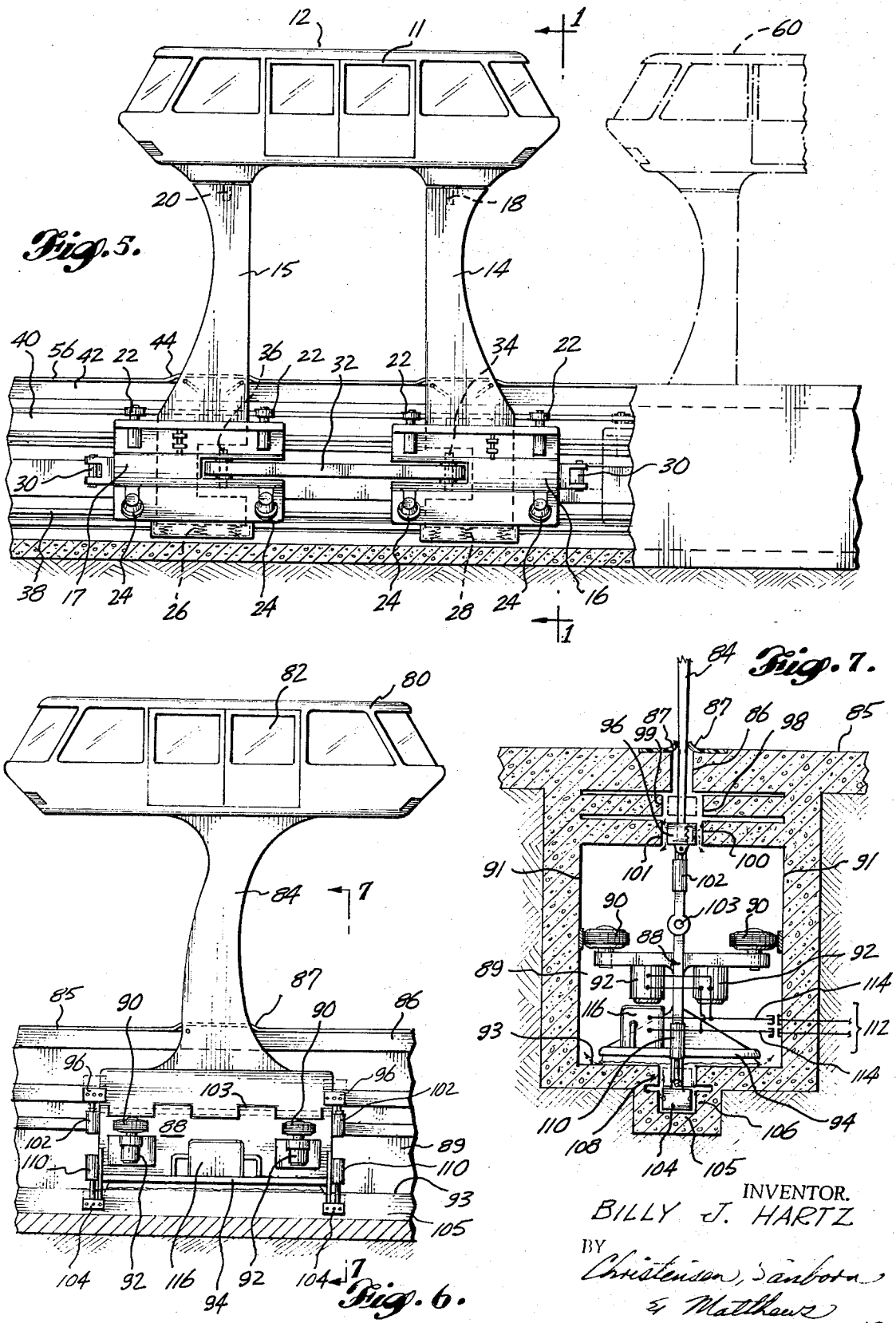

INVENTOR
BILLY J. HARTZ
BY Christensen, Sanborn
& Matthews
ATTORNEYS

MASS TRANSIT SYSTEM

RELATED APPLICATION

This application is a continuation of Ser. No. 77,060, filed on Oct. 1, 1970 now abandoned.

FIELD OF THE INVENTION

This invention relates to a mass transit system and, more particularly, to an urban mass transit system for transporting individuals from one location to another in an urban area, and which is adaptable for use with existing right-of-way usages.

PRIOR ART

It is known in the prior art to position the running gear of cable trolley cars beneath the surface of the pavement and have the trolley car passenger compartment positioned immediately above the pavement and connected to the running gear with a vertical member running down from the passenger compartment to the running gear. Similarly, it is known to use monorail type of vehicles in which the passenger compartment sits directly upon an elevated rail member to minimize interference with surface traffic and travels on the rail member by use of steel or rubber tire-type running gear. It is also known to use trolley car systems either self-propelled or cable towed having steel tracks embedded in the surface of the roadway upon which steel wheels or rubber tired wheels may run to carry the trolley on its way. An example of such a system would be the well known cable car system in San Francisco. Each of these systems has the obvious disadvantage that it interferes with the other uses of the roadbed right-of-way and frequently is limited in usefulness due to the problems presented by the elements, such as rainfall and snow. In addition, supplying power to such transit systems in the event that they use electrical power requires the use of overhead lines or conductors embedded in the surface of the roadbed, either system being subject to criticism from an aesthetic or safety point of view. Furthermore, such systems take up a significant right-of-way and are thus not compatible with existing freeway systems and rapidly increasing urban street usage. The cost of preparing right-of-way roadbeds, major underground excavations, tunnels and access facilities for train-type systems or subway systems makes their use limited to trunk-line type of operation. Noise, aesthetics and excessive cost associated with the permanent supporting structure likewise exclude monorail systems from installation in the residential areas where mass transit system should originate.

Other types of transit systems currently in use which utilize internal combustion engines for motive power do not suffer from the problems of high installation expenses for right-of-way and roadbed. However, this type of transit system presents even greater problems of expensive operation and severe air pollution as well as unacceptably high noise levels and street congestion in urban areas. While some of these problems may be overcome by advances in the technology of internal combustion engines, it is necessary to have a completely new concept in mass transit to meet the competing problems of air pollution, increasing urban street congestion and increasing expense of right-of-way installation and operation, yet adequately serve the outlying residential areas as well as the urban and surburban types of neighborhoods. Such a system must be compatible with the existing usages of the street rights-of-way and not require new right-of-way. The system should also be acceptable to city dwellers and suburbanites alike from an aesthetic point of view. It must be sufficiently inexpensive to permit installation throughout suburban communities, yet have versatility to handle high density passenger loads in congested urban areas. The system must not be limited by automobile traffic flow patterns, yet must fit in and be compatible with the present day usages and projected usages of the existing right-of-way.

OBJECTS OF THE INVENTION

It is therefore an object of this invention to provide a mass transit system capable of handling a variety of passenger load densities at increased speed which utilizes, but yet is fully compatible with, existing right-of-way usages in urban, suburban and rural areas.

A further object of this invention is to provide a mass transit system which requires no new right-of-way but uses the presently existing urban and suburban street rights-of-way without significantly adding to the congestion thereon.

An additional object of this invention is to provide a mass transit system which is substantially pollution free, is aesthetically pleasing, and which provides pleasant, unobstructed, noise-free passenger compartments with smooth riding characteristics.

It is a still further object of this invention to provide a rapid transit system having no overhead wires, exposed tracks or other safety hazards presently known to the prior art transit systems and which is unhampered by rain, ice, snow or bad weather.

One specific object of this invention is to provide a vehicle for use in a mass transit system which has the passenger compartment thereof separated substantially from the running gear by means of a vertical strut so that the running gear may be positioned beneath the surface of a right-of-way and the passenger compartment above the surface traffic to free the right-of-way for other purposes while furnishing a means of rapid mass transportation which is not impeded by surface traffic congestion.

A further specific object of this invention is to provide a rapid mass transit system which may be operated in a car reversal mode, in a looped track mode or which may be switched from track to track by use of a novel switching apparatus.

One additional specifc object is to provide a mass transit system in which transit cars of various sizes may be utilized.

A still further object of this invention is to provide a mass transit system which may be adapted to use steel or rubber wheel type running gear or air suspension with conventional electric linear induction or other types of energy sources to provide the power necessary to drive the mass transit vehicle.

SUMMARY OF THE INVENTION

The mass transit system provided by this invention contemplates a vehicle comprising a running gear positioned in an entrenched compartment below grade in an existing street right-of-way or in other locations, which is connected to a passenger compartment positioned above the running gear on one or more structural struts so that the passenger compartment is positioned substantially above the street level, permitting the normal street traffic to pass beneath. The separation between the running gear apparatus and the passenger compartment provides substantially noise-free, polution free, clean and comfortable passenger transportation system with essentially no right-of-way requirements beyond those already in use, with no new permanent impediments to existing conventional vehicular traffic.

Entrance into the passenger compartment in the mass transit system of this invention is usually effected in urban areas at the second or mezzanine floor level of a building or in areas where there are no buildings presently constructed or, in residential areas, an overhead bridge arrangement, combined with pedestrian overpasses, may be provided wherein the passengers ascend a flight of stairs and enter the cars at that level. Means may be provided so that passengers may cross over from one side of the overhead bridge to the other side so as to catch the proper transit vehicle.

The running gear may be one of any of the well-known apparatus presently used for such purposes or may be of the "ground-effect" type. For example, steel wheels on tracks may be used or rubber tires running upon concrete or other running surface may be advantageously employed. The ground-effect or "air-pad" type of support system, utilizing a support pad through which compressed air is forced so as to raise the running gear from the support surface may also be used to support the weight of the vehicle and to permit it to move along its intended path.

Should it be desired to install a transit system in which switching is necessary, the conventional switching mechanisms presently used for steel wheel on track-type of running gear may be utilized for the undercarriages having steel wheels and tracks for support mechanisms. For the rubber tire upon concrete type of support system, a novel vertical stabilizing apparatus disclosed herein may be employed which travels along one of two or more paths to constrain the vehicle upon its intended path. Similarly, for the ground effect type of support system, a pair of air pad-type lateral stabilizing units may be used, each to run upon one of two selected independent paths to constrain the vehicle along its intended path.

These and other objects, advantages and attributes of this invention may be more readily observed and understood by reference to the several preferred embodiments shown in the attached drawings and described in detail below. Reference is now made to the drawings wherein:

FIG. 1 is a front elevational view of the apparatus of this invention;

FIG. 2 is a cross sectional view of the vertical strut used in the apparatus shown in FIG. 1, taken along line 2—2;

FIG. 3 is a front elevational view, of one type of switching mechanism used in this invention;

FIG. 4 is a schematic representation of one type of switching means utilized in this invention;

FIG. 5 shows a side elevational view of one embodiment of this invention utilizing a pair of vertical support struts;

FIG. 6 shows a second embodiment of this invention utilizing a single support strut and having a ground effect support mechanism;

FIG. 7 is a cross sectional view of the running gear portion of the embodiment of this invention shown in FIG. 6, taken along line 7—7 thereof;

Figure 8:
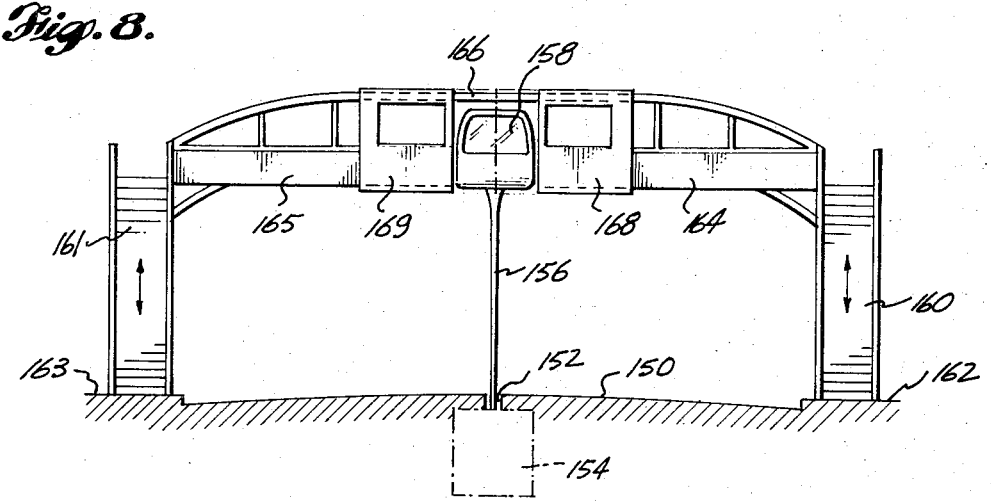
FIG. 8 shows one type of single position station for loading and unloading passengers.

Referring more particularly to the drawings, wherein like numerals indicate like parts, there is seen in FIGS. 1 and 5 one embodiment of the mass transit system disclosed in this invention. A passenger compartment 12 having doors 11 is shown supported by a pair of struts 14 and 15 which are in turn carried by the running gears 16 and 17 respectively. Strut 14 is provided with a pivot means 18 directly beneath the passenger compartment 12 and strut 15 is provided with a similar pivot 20 also positioned directly beneath the passenger compartment. Running gears 16 and 17 are connected together by draft link 32 at pivot points 34 and 36 respectively. This draft linkage permits articulation between the two running gears 16 and 17, permitting the flexibility necessary to navigate corners. The struts 14 and 15 may be firmly connected to running gears 16 and 17 or may be carried by a spring damped connection 26 and 28 as shown in FIGS. 1 and 5. The running gears 16 and 17 are carried by a plurality of wheels 24 which, in turn, engage rails 38. The wheels 24 shown in FIGS. 1 and 5 comprise steel wheels adapted to run upon steel tracks 38. However, rubber tires may, of course, be substituted and, in that event, the rails 38 would not be present permitting the rubber tires to run directly upon the tunnel floor 37.

To maintain the necessary vertical stability a plurality of lateral stabilizing wheels 22 are provided for each running gear which engage vertical stabilizer tracks 23. These may be steel wheels on steel tracks, however, rubber tires running upon tracks 23 or directly upon the walls 25 of the entrenched compartment 40 will provide a lesser amount of noise and vibration. A coupling 30 may be provided at each end of the transit car so as to permit connection of additional cars thereto to run the transit cars in a train. The ghost outline of a second car 60 is shown in FIG. 5 to demonstrate this mode of operation.

Referring particular to FIG. 1 showing a front view of the transit vehicle, passenger compartment 12 is shown positioned substantially above the upper surface of the pavement 56 and is carried by strut 15. Strut 15 extends downwardly to the running gear 17 through slot 42 in the pavement 56. A rubber or other elastomeric material 45 may be utilized as slot cover 44 to prevent entrance of dirt, rain, water and snow and other foreign materials into tunnel 40 but yet permit the cart to travel along with the struts opening the slot cover 44 much like a zipper. Strut 15 may be equipped with air jets to open slot cover without causing damage thereto by friction of the strut surface upon the slot cover. The running gear 17 and the surface upon which it travels are all located inside compartment 40, which is positioned beneath the right-of-way surface 56 thus freeing the surface 56 for its normally intended uses for conventional vehicles and pedestrians while providing a versatile mass transit system. Entrenched compartment 40 may also contain utilities such as telephone and electrical wires 51, water supply 49, sewer pipe 53 and the like positioned inside utilities chamber 50 and 55 or at other appropriate locations within the compartment 40.

The power supply needed to operate the transit system may be provided by the use of the required number of electrical contact brushes 55 traveling along the power supply conductors 52. This power supply may be utilized to drive the support and drive wheels 24 and may be used to supply power to utilities necessary for passenger comfort and for operation of the transit vehicle.

Referring particularly to FIG. 6, there is shown a single strut embodiment of this invention wherein a passenger compartment 80, having door 82, is positioned substantially above the right-of-way level 85 on strut 84 to permit operation of the rapid transit system without substantial interference with existing usages of the right-of-way. A running gear and under-carriage 88 is connected to the passenger compartment 80 by vertical strut 84 extending upwardly through slot 86.

With reference to FIGS. 6 and 7, the running gear 88 of "ground effect" embodiment of the invention shown comprises a horizontally oriented plate 94 positioned directly above the bottom 93 of tunnel 89. Compressed air from the compressor 116 is forced downwardly through a plurality of air nozzles (not shown) in plate 94 in a sufficient volume and pressure to cause the transit vehicle to be lifted slightly, permitting it to travel along its intended path. Drive wheels 90, which are preferably tensioned outwardly against the compartment walls 91 by use of springs, air cylinders, or the like are used to impart motion to the transit car. Drive motors 92 supply the required rotational motion to the drive wheels 90.

The lower portion of the running gear 88 extends downwardly into a recess 105 which defines a pair of bearing surfaces 106 and 108 along each side thereof. An air cushion stabilizer 104 extends downwardly into the recess 105 and is positioned next to one or the other of the bearing surfaces 106 and 108. An air bearing is maintained between the air cushion stabilizer 104 and the walls of recess 105 by use of air jets directed outwardly from the air cushion stabilizer 104. Bearing surfaces 106 and 108 define separate tracks for switching purposes and, depending upon which track is desired, the air cushion stabilizer 104 is positioned by switching cylinder 110 so that air from the air cushion stabilizer 104 impinges upon the walls of bearing surface 106 or 108 and constrains the running gear to travel along the path so chosen.

A vertical stabilizer air pad and switching apparatus is positioned at the upper portion of compartment 89. An upper pair of bearing surfaces 98 and 99 and a lower pair of bearing surfaces 100 and 101 define separate tracks for switching purposes and a lateral stabilizer air pad 96 is positioned therein. Air pad 96 is constructed and arranged to impinge air upon one or the other of the pairs of bearing surfaces. The position of the vertical stabilizer air pad 96 may be changed from a first position as shown in FIG. 7, wherein the air from the vertical stabilizer air pad impinges upon bearing surfaces 100 and 101 to a second position (shown in outline) wherein the vertical stabilizer air pad impinges air upon bearing surfaces 98 and 99. Movement of the vertical stabilizer air pad 96 from one position to the other may be effected by use of a switching cylinder 102 thus causing the vehicle to follow the path defined by the bearing surfaces upon which the air from air pad 96 impinges.

Electrical power is provided to the running gear and utilities of the transit car shown in FIGS. 6 and 7 through use of conductors 112 which are engaged by brushes 114. The schematic arrangement shown may then be used to distribute the power to various pieces of equipment in the running gear and passenger compartment or any other suitable distribution system well known in the art may be utilized.

A pivot 103 is shown positioned in the running gear approximately mid-way between the vertical stabilizer air pad 96 and the air cushion stabilizer 104. By regulating the amount of air which is ejected from each side of air pad 94, leaning or swaying of the passenger compartment 80 may be substantially counteracted and controlled to within an acceptable amount. Advantageously, the degree of sway or leaning of the passenger compartment 80 would be sensed by a computer input sensor located in the passenger compartment 80 and the sway counteracted by means of a servomechanism operative upon the running gear. Alternately, the pressure applied to the drive wheels 90 may be varied in response to a sway sensor so that strut 84 may be maintained in its vertical position through articulation of pivot 103. Another means to maintain the desired stability and orientation would be to use a more conventional arrangement of hydraulic servo-cylinders to control the angle across pivot 103 in response to the sway sensor.

Referring particularly to FIG. 2, a cross section of one embodiment of the strut 15 is shown. The particular configuration is chosen with the radius of the arcs at 48 being substantially equal to the outer radius of the slot at 42a. The interior curve 46 of the strut is chosen to be substantially equal to the radius of curvature of the slot at 42b indicated by the curvature radius R. This configuration provides the maximum amount of material for use in the strut 15 commensurate with the requisite ability to traverse a curved section of the slot.

In FIGS. 3 and 4 details of one embodiment of the switching mechanism used in this invention are shown. Stabilizer wheels 136 and 138 are provided in this embodiment to serve the function of lateral stabilization and switching of the car from one track to another. The lateral stabilizer air pad and switching apparatus shown in FIGS. 6 and 7 could serve here equally well. In the embodiment shown in FIG. 3, the stabilizer wheel 136 is forced outwardly against either upper right switching track 130 or lower right switching track 132. The stabilizer wheel 138 is forced outwardly against either upper left switching track 131 or lower left switching track 133. The stabilizer wheels are constructed and located so as to keep strut 84 located substantially in the middle of slot 42 at all times. Slot 42 splits into two tracks 42R and 42L, which define the path of the strut 84 whenever the transit car traverses the slot chosen. The right upper switching track 130 and left upper switching track 131 define the path of the stabilizer wheels 136 and 138 respectively whenever the transit car takes the left hand path defined by slot 42L. Guide 134 is positioned so that wheel 138 may engage it at the time stabilizer wheel 136 passes slot 42R which eliminates a portion of the right upper switching track 130. To traverse the straight path defined by slot 42R, the stabilizer wheels 136 and 138 are lowered into the position at which they engage right lower switching track 132 and left lower switching track 133 respectively. When traveling upon this path, the transit car will proceed straight ahead along the path defined by slot 42R. Switching cylinders 140 and 142 are utilized to raise and lower the stabilizer wheels 136 and 138 respectively.

Figure 9:
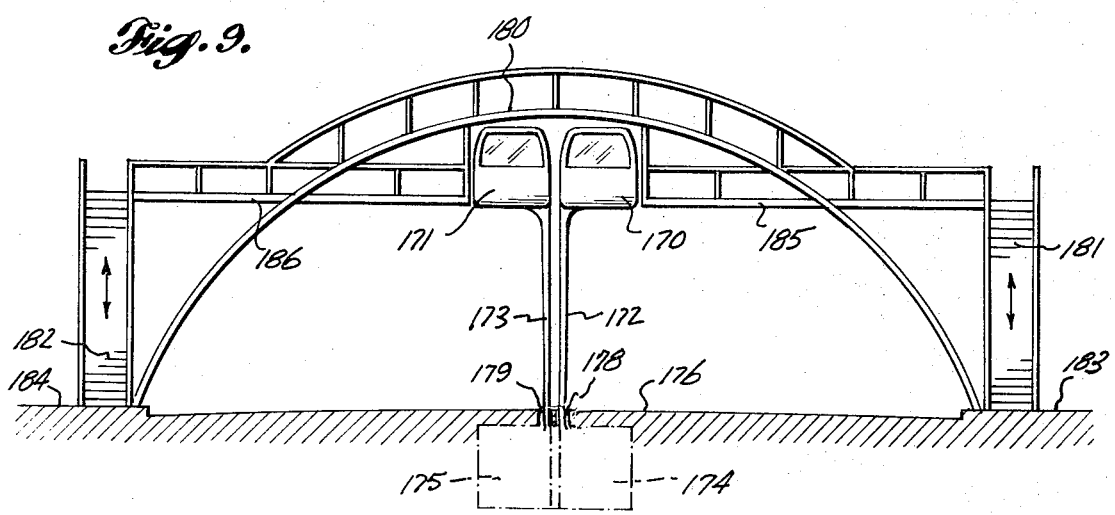
FIG. 9 shows one embodiment of a two position station for loading and unloading passengers.
Figure 10:
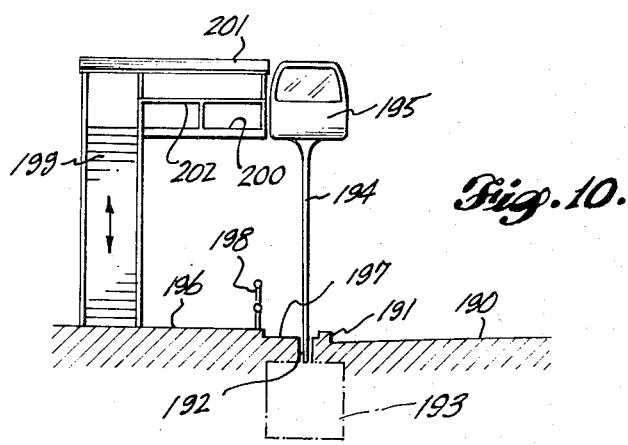
FIG. 10 shows a single position sidewalk access station particularly adapted for use in urban areas.

Referring now to FIGS. 8 through 10 three different embodiments of the many types of passenger loading and unloading stations suitable for use when the transit system described in this invention are shown. Of course, in urban areas, entrance into and exit from the transit vehicles will usually be accomplished at the mezzanine level or second floor of existing buildings. However, in areas which do not have suitable buildings, structures as shown in FIGS. 8 through 10 may be constructed and utilized. In FIG. 8, a passenger loading station is shown for use over a normal street in an urban area with the transit system operating in the center thereof between the lanes of traffic. The road surfaces 150 has a slot 152 cut therein which communicates with a tunnel 154 containing the running gear and associated apparatus for driving the transit car. A curb (not shown) may be provided at each side of the slot 152 if desired to aid in maintaining traffic flow away from the slot. Strut 156 carries the passenger compartment 158 well above the level of the streets so as to not interfere with the normal surface traffic functions of the roadway below. Stairways 160 and 161 are provided at each side of the station and may be positioned at one side or the other of the sidewalks 162 and 163 respectively. The passenger loading platform 164 and 165 is provided at the proper level for entering the passenger compartment 158 and is supported overhead by arch 166. Movable sections 168 and 169 are moved inwardly whenever a transit car is not present so that the station serves as a pedestrian overpass, or in the event of two-way operation as depicted in FIG. 9, so that passengers may move from one side to the other for the purpose of boarding the proper transit car or to exit on the desired side of the street. The movable sections 168 and 169 are retracted whenever a transit vehicle approaches so that it may enter unimpeded into the loading position shown in FIG. 8.

A second embodiment of the transit system of this invention for use at the center of an existing roadway is shown in FIG. 9. In this embodiment, a pair of offset-type transit vehicles are shown having passenger compartment 170 and 171, struts 172 and 173 respectively and running gear tunnels 174 and 175 respectively positioned beneath the roadway 176 at the approximate center thereof. Struts 172 and 173 pass downwardly through the roadway through slots 178 and 179 respectively. In this embodiment the strut attaches to the side of the passenger compartment rather than at the middle so that a pair of transit vehicles may pass side by side without having the slots through the roadway spaced far apart. Thus, a minimum amount of the existing roadbed will be disrupted through use of the transit system. The station shown in FIG. 9 has an overhead walkway 180 provided so that passengers may pass from one side of the street to the other and also so that they may enter either of the cars as desired. Stairways 181 and 182 are positioned upon sidewaks 183 and 184 respectively and connect with the passenger loading platforms 185 and 186 respectively.

FIG. 10 shows a third embodiment of the passenger boarding station particularly for use in urban areas in which there is a sidewalk present with a parking strip between the sidewalk and the curbing. In FIG. 10 a street surface 190 is shown with a curb 191 at the edge thereof. Immediately adjacent the curb 191 is a slot 192 extending downwardly into tunnel 193 which houses the running gear for the transit car. Strut 194 extends upwardly to passenger compartment 195 positioned above the street level so as to not interfere with the normal usages associated with the street and sidewalk. Sidewalk 196 is positioned inwardly from the parking strip 197 and separated therefrom by a fence or railing 198. A stairway 199 is provided extending upwardly from the sidewalk 196 to the passenger loading platform 200. A roof 201 may be provided to protect the passengers from the elements while waiting for the transit car. Railing 202 and other safety features may be provided as needed.

The novel mass transit system of this invention thus provides a system compatible with existing right-of-way usages of streets and alleys and the like which may be combined with the utilities required to service a community. A safe, effective rapid mass transit system thus results which is aesthetically pleasing and eliminates the drawbacks previously encountered with rapid transit systems heretofore known. The relatively low costs involved to prepare and operate the system make it conducive for use in serving residential areas effectively yet permits the use of larger vehicles on trunk lines adding the necessary versatility completely lacking in prior art transit systems. Small to medium sized cars may be used in residential areas while larger cars or several cars connected together may be used in areas of high population density or urban areas in which a large number of people must be transported from one location to another. The present design of existing streets, roads, and freeways will permit the installation of this mass transit system as a part thereof without the need of condemning additional right-of-way by placing the entrenched compartment and slot in the median strip or underneath the roadway shoulders. The simple and effective switching means permits the rapid transit cars to enter and leave trunk lines to serve outlying communities or to bring passenger loads into the high density urban area. The air pollution problem associated with internal combustion powered transit systems is eliminated by the use of electricity to provide the power necessary to operate the transit vehicle.

Many modifications to this basic rapid transit system concept will, of course, be immediately obvious to one skilled in the art and such modifications are intended to be within the scope and spirit of this invention.

What is claimed is:
1. A mass transit system comprising:
   an elongate passageway means, at least a portion of which underlies and is substantially parallel to a roadway, said passageway means defining running surfaces, said running surfaces having reaction surface means therein for providing vertical and overturning moment reaction components, said passageway means communicating with ground level through a single elongate slot;
   running gear means positioned for movement within said passageway means upon said running surfaces;
   strut means connected to and supported by said running gear means and extending upwardly through said slot into supportive engagement with a load carrying compartment means, the upwardly extending height of said strut positioning said compartment means a distance above ground level whereby pedestrian and vehicular traffic traversing said roadway at ground level and parallel to said passageway means can pass underneath said compartment.

2. The mass transit system of claim 1 wherein said slot has a flexible closure positioned at the level of said roadway covering said slot in the absence of said strut.

3. The mass transit system of claim 1 wherein two or more of said passageway means each communicating with ground level through a single elongate slot intersect and include selective switching mechanism to permit said running gear means to transfer from one passageway means to another passageway means.

4. The mass transit system of claim 3 wherein said selective switching mechanism cormprises:
   at least two vertically separated, substantially horizontally extending guide surfaces, one of said guide surfaces following the path of one passageway means, and at least a second guide surface following the path of said other passageway means;
   vertically extensible and retractable follower means on said running gear means so arranged thereon as to be selectively positionable to follow one of said guide surfaces.

5. The mass transit system of claim 1 further comprising a plurality of passenger loading platform means positioned at the level of said load-carrying compartment.

6. The mass transit system of claim 5 wherein said platform means comprises a pedestrian overpass means adapted to permit passage of pedestrians across said roadway.

7. The mass transit system of claim 6 further comprising movable platform sections retractable to permit passage of said compartment through said platform means.

8. The mass transit system of claim 1 wherein said running gear means comprises at least one support mechanism having a plurality of wheels adapted to engage said running surfaces.

9. The mass transit system of claim 1 wherein said running gear means comprises at least one ground effect support means.

10. A mass transit vehicle capable of being used in an elongate passageway means, at least a portion of which is substantially parallel to a roadway, said passageway means defining running surfaces, said running surfaces having reaction surface means therein for providing vertical and overturning moment reaction components, said passageway means communicating with ground level through a single elongate slot, said vehicle comprising:
   running gear means positioned for movement within said passageway means upon said running surfaces,
   strut means connected to and supported by said running gear means and extending upwardly through said slot into supportive engagement with a load carrying compartment means, the upwardly extending height of said strut means positioning said compartment means a distance above ground level whereby pedestrian and vehicular traffic traversing said roadway at ground level and parallel to said passageway means can pass underneath said compartment means.

11. The mass transit vehicle of claim 10 wherein said running gear means comprises at least one support mechanism having a plurality of wheels adapted to engage said running surfaces.

12. The mass transit vehicle of claim 10 wherein said running gear means comprises at least one ground effect support means.

13. The mass transit vehicle of claim 10 wherein said running gear means comprises a pair of separate carriage elements separately pivotally articulated together and wherein said strut means comprises a pair of substantially vertical elements, each of said vertical elements extending upwardly from one of said carriage elements to said compartment means.

14. The mass transit vehicle of claim 10 further comprising:
   selectively positionable guide means on said running gear to selectively engage corresponding guide surfaces in said passageway means, said guide surfaces defining disparate paths so as to constrain said vehicle on one of said paths at intersections of two or more passageway means.

15. The mass transit vehicle of claim 14 wherein said guide means comprises:
   a vertically extensible and retractable guide member so arranged as to selectively engage one of at least two horizontally extending, stationary, vertically separated guide paths in said passageway means.

16. A strut for use in a mass transit system comprising an elongate passageway means communicating with ground level through two adjacent spaced surfaces defining a single elongate slot, said passageway means and said slot having curved sections, said curved sections of said slot defined by an inside curved surface and an outside curved surface, each of said curved surfaces having a determinable radius of curvature, running gear means positioned for movement in said passageway means, and a load carrying compartment means, the strut comprising:
   a vertically elongate member connected to and supported by said running gear means and extending upwardly into supportive engagement with said load carrying compartment means, said member in the region of said slot having an outside and an inside exterior wall means defining in lateral cross section a compound curve on each side of said member, said curve of said outside wall means having a convex forward portion having a radius of curvature substantially equal to said determinable radius of curvature of said outside curved surface, a concave central portion and convex rearward portion having a radius of curvature substantially equal to said determinable radius of curvature of said outside curved surface, said curve of said inside wall means having convex forward and rearward portions and a concave central portion having a radius of curvature substantially equal to said determinable radius of curvature of said inside curved surface.

17. The strut of claim 16 wherein the concave portion of said curve of said outside wall means has a radius of curvature substantially equal to said determinable radius of curvature of said inside curved surface and the convex portion of said curve of said inside wall means has a radius of curvature substantially equal to the determinable radius of curvature of said outside curved surface.

* * * * *